United States Patent [19]
Dickerson

[11] Patent Number: 5,578,211
[45] Date of Patent: Nov. 26, 1996

[54] WASTEWATER GAS REDUCTION METHOD

[76] Inventor: J. Rodney Dickerson, P.O. Box 827, Scott, La. 70583

[21] Appl. No.: 587,554
[22] Filed: Jan. 17, 1996
[51] Int. Cl.$^6$ .................. C02F 3/30; C02F 3/34
[52] U.S. Cl. .................. 210/610; 210/620; 210/630; 210/631; 210/920
[58] Field of Search .................. 210/601, 610, 210/611, 614, 615, 620, 630, 631, 760, 170, 920

[56] References Cited

U.S. PATENT DOCUMENTS

| | | | |
|---|---|---|---|
| 4,042,494 | 8/1977 | Stoyer | 210/170 |
| 4,115,258 | 9/1978 | Smith et al. | 210/614 |
| 4,469,596 | 9/1984 | Kantor | 210/170 |
| 4,925,564 | 5/1990 | Francis | 210/610 |
| 5,114,586 | 5/1992 | Humphrey | 210/620 |
| 5,141,647 | 8/1992 | Bhadra | 210/620 |
| 5,462,666 | 10/1995 | Kimmel | 210/614 |

Primary Examiner—Thomas G. Wyse
Attorney, Agent, or Firm—Warner J. Delaune

[57] ABSTRACT

A method of reducing undesirable gases in a wastewater collection piping system is provided, comprising the introduction of select microbes into the piping system at a frequency corresponding to the pumping activity of the pumping stations, and in an amount proportional to the surface area of the interior surface of the piping system; wherein the select microbes are capable of completely consuming the predominant waste material in the wastewater; and wherein an anaerobic biomass comprising almost entirely the select microbes is formed along the interior surface of the piping system. In the foregoing method, the select microbes are preferably non-pathenogenic and may be introduced in an initially non-active state. Furthermore, the select microbes may also be capable of functioning in either an aerobic or an anaerobic manner. In a more preferred embodiment, the level of nitrogen in the piping system is monitored, and the introduction of the select microbes is adjusted to maintain at least 0.1 mg/l of total nitrogen in the wastewater. Optionally, a predetermined quantity of ozone may be introduced into the piping system at selected locations to further reduce the presence of the undesirable gases.

7 Claims, 1 Drawing Sheet

WASTEWATER GAS REDUCTION METHOD

BACKGROUND OF THE INVENTION

I. Field of the Invention

The present invention relates generally to the treatment of wastewater, and more particularly to the reduction of undesirable gases in wastewater traveling through sewage collection piping systems.

II. Description of the Problem

In the treatment of wastewater, lift stations and pretreatment facilities are often plagued by two distinct, but related, problems: the generation and release of malodorous gases, caused by hydrogen sulfide and mercaptans, and structural damage caused by the same microbes responsible for the presence of the gases. Because the problem of structural damage to these facilities has a more direct economic impact upon the municipalities whose charge it is to treat the wastewater, this invention primarily involves methods for protecting wastewater lift stations and pretreatment plants from such damage. The structural damage is largely the result of biological attack with the microbes feeding off the gases released from the sewage as it passes through the structures. As part of this feeding, the microbes attack the substrate material, e.g. the walls, ceilings, and other surfaces, within the structure to which they are attached as an additional source of food. These mechanisms are discussed in detail in my copending application Ser. No. 08/492,200, as well as in my prior patent, U.S. Pat. No. 5,433,854, the disclosures of which are incorporated herein by reference. Areas where the climate is mild most of the year, such as Florida, experience such problems in an ongoing manner. Publications such as the Florida Water Resources Journal recount the problems in articles such as "Hydrogen Sulfide Corrosion Control", Odom, et al., July 1993, pp. 40–42. This article defines the problems and suggests the use of protective coatings within the piping and structures to "increase the expected life span" by protecting against attack. Importantly, the authors note that there is no solution in preventing the attack, only protecting against it.

The aforementioned patent and application concern the introduction of controlled amounts of ozone-containing air to the vapor space immediately above the liquid level within the lift stations and pretreatment structures. The quantity and method of introduction of the ozone-containing air is such that sufficient amounts of ozone are available at the surface of the liquid to destroy the gases which the microbes use as food as they evolve. Furthermore, the amount of ozone is such that its biocidal effects destroy the microbial mass on the interior surfaces of the structures, thereby preventing damage to the structure. Destroying the gases and bacteria result not only in the prevention of structural damage, but also in the elimination of foul odors which are ordinarily present.

In the course of applying the ozone-containing air to various structures, it became apparent that the amount of ozone required to accomplish the destruction of gases and biomass could be reduced if the quantity of gas being released from the water could be reduced. Furthermore, not only would a reduction in the quantity of the gas be a benefit, but reducing the concentration of certain odorous compounds, such as hydrogen sulfide and mercaptans, would also be advantageous. This is especially true in piping systems where the wastewater is pumped long distances in what are commonly referred to as "forced mains". These pipes often cover distances of several miles and are completely filled with wastewater. The long distances mean that the wastewater often stays in the piping system for many hours (over one day in some cases), which results in a total depletion of oxygen within the piping system. The lack of oxygen is often referred to as a "septic" condition, and it is generally accompanied by the production of very foul odors and large quantities of hydrogen sulfide gas.

In order to completely understand this phenomenon, one must envision the interior surface of the wastewater piping system. Since the wastewater is filled with microbes, the microbes form a film of biomass on the interior surface of the pipe. This is particularly true of large diameter piping where low flow velocities prevent the force of the flow from scouring the surface with solid particles of sand and other matter. This film of biomass adapts readily to its environment, and it evolves with the dominant species of microbes that survive best under those conditions.

In nearly all instances, microbes that produce hydrogen sulfide gas as a by-product of their consumption of sulfate-containing material (hereinafter referred to as "sulfur reducing bacteria" or "SRB's") will be the dominant species. These microbes do not require oxygen, are always present in human waste, and grow rapidly on the walls of the piping system. They also grow on the suspended solids in the waste and on that portion of the suspended solids that settle out in the pipe when there is little or no flow. This occurs because anaerobes, i.e. microbes that exist without oxygen, such as sulfur reducers, only reproduce when they are attached to a surface. This surface may be the wall of the pipe or some bit of suspended matter. When the wastewater is moving slowly or not at all, the hydrogen sulfide gas produced by these bacteria accumulates in the wastewater in their vicinity.

In addition to the SRB's, other anaerobic bacteria exist in the system. These may vary in nature, but the most prevalent bacteria which compete with the sulfur reducers are methanogens. These bacteria primarily produce methane gas rather than hydrogen sulfide, and they compete, along with other bacteria, for food and space within the system. Unfortunately, without intervention, the SRB's usually dominate most of the time.

Another aspect of these closed piping systems that is often overlooked is the fate of the methane gas and its role in the piping system. Methane is virtually insoluble in water, so it collects as a separate gas phase within the piping system. Piping designers have positioned so-called "air release valves" at strategic points within the piping to relieve what they mistakenly believed was air. In actual practice these valves are almost always out of service, because the biomass fouls the mechanism, causing them to fail in the open position. This failure often results in wastewater being discharged on the ground. Moreover, operators who must operate these valves manually are understandably reluctant to make frequent adjustments to the valves, because the concentration of hydrogen sulfide gas is very high and offensive to the area.

When the gas cannot be released through the valves, the insoluble methane gas collects at the top of the pipes until the bubble is large enough to move downstream. This condition contributes greatly to the problems in two key respects. First, the methane gas bubble interferes with the normal hydraulic flow within the piping. Second, the hydrogen sulfide gas is highly soluble in methane, and it can accumulate in the gas phase in concentrations many times that of the water phase concentration (as has previously been shown in my '854 patent). When this accumulation occurs and the bubble of high strength methane gas enters a lift station, very high concentrations of hydrogen sulfide gas are released, because the hydrogen sulfide is already in the insoluble methane gas phase. In such instances, depending upon a number of variables, the volume and concentration may be such that the methods described in my previous patent will be less effective, because there may not be enough available ozone within the vapor space. When this happens, noxious odors may still be a problem due to the hydrogen sulfide being vented. Clearly, this is an undesirable situation.

Therefore, the present invention is directed toward preventing the formation of large quantities of hydrogen sulfide and methane gas within the wastewater collection piping system prior to lift stations and pretreatment facilities. By preventing such formation, the amount of hydrogen sulfide and methane gas entering the facilities is kept within ranges wherein various ozone-treatment methods, such as that disclosed in the '854 patent, can be practiced without periodic disruptions. Furthermore, it allows those methods to be applied in places that would, under other circumstances, be impractical.

III. DESCRIPTION OF THE PRIOR ART

There are a number of techniques which have been proven to reduce the presence of hydrogen sulfide in wastewater. These techniques typically involve the addition of chemicals to react with the hydrogen sulfide and render it into another state where it becomes essentially odorless. Such chemicals include iron salts, hydrogen peroxide, caustic soda and chlorine. Some chemicals, such as hydrogen peroxide and chlorine, also act as a biocide to kill the biofilm on the pipe walls. Other compounds include nutrients which stimulate methanogenic bacteria to "competitively exclude" the SRB's, compounds touted to add oxygen to the wastewater, and compounds which prevent the SRB's from producing hydrogen sulfide gas.

Upon critical examination of these and other techniques, several points are apparent. First, since the flowrates within the complex piping system cannot easily be controlled, nor can the composition of the wastewater, it is impossible to know when or how much of a given chemical should be added to the system. It is also impossible to consistently control the hydrogen sulfide concentrations. In most instances, the cost of adding even a modest amount of chemicals proves to be economically disadvantageous. Second, the use of such chemicals involves some type of tradeoff in that the treatment system suffers somewhere else in the collection piping system as a result of adding the chemicals. Finally, based on the problems presented by the first two points, a different approach is needed that will overcome these obstacles.

When examining the mechanisms within the piping that bring about the production of hydrogen sulfide and methane gas, it becomes apparent that the best solution is to work within the biological mechanisms themselves. The prime mechanism at work is "competitive exclusion". The SRB's are well-suited to their environment, and they dominate the other microorganisms competing for the same food and space. However, the SRB's themselves are subject to competitive exclusion if other more dominant microorganisms are introduced in numbers that are effective.

Numerous demonstrations by others have been made of adding select microbes on a "batch" basis to collection piping systems to reduce hydrogen sulfide production. In nearly all cases, significant reductions in hydrogen sulfide concentrations resulted. Indeed, some demonstrations added microbes on a continuous basis from large drums at various locations with a great degree of success. These demonstrations were all focused on controlling odors at lift stations and pretreatment plants. Even though they enjoyed some success in reducing the odor levels, they could not, as previously demonstrated in my prior work, eliminate all the odors nor stop the structural damage. Because of this lack of complete success and the ongoing cost of microbe addition, such projects were soon abandoned.

As will be explained further herein, the only successful way to deal with the hydrogen sulfide is to eliminate the source, which are the SRB's that exist in the biomass on the walls of the collection system piping. Any solution that does not include the elimination of SRB's is analogous to treating the symptoms of a disease rather than the cause. Prior to this discovery, the standard methods of dealing with SRB's involved either biocidal destruction (as explained earlier herein) or the injection of oxygen into the system. Since SRB's are strict anaerobes, the presence of oxygen prevents them from working. The problems with these methods are readily apparent. First, SRB's can go into a dormant "spore" state very quickly. This is a survival technique which literally shuts down the microbe until favorable conditions return, and only certain powerful and expensive biocides can kill the SRB's even in spore state. Second, the human body contains SRB's in the lower digestive tract, and they are constantly re-introduced into the collection system by way of fecal matter.

Injection of oxygen into the piping is not only expensive, but presents an ongoing challenge as the aerobic microbes, which utilize the oxygen, multiply rapidly. As the aerobic microbes increase, an ever-increasing amount of oxygen is needed, and a point of diminishing returns is rapidly reached. The bottom line is that neither of the previous methods is very effective in practice, nor are they economical. Furthermore, the use of biocides in the piping will have a negative impact on the operation of the treatment plants.

Various prior art methods suggest the viability of using select microbes to compete with the sulfur reducing bacteria. However, many of those methods focus only on the reduction of SRB's in connection with oil and grease. Mention is occasionally made of utilizing the collection piping system to degrade the waste, but no specific details are given on how to accomplish this other than to add certain microbes to the piping system. The references provide insufficient information as to which types of microbes are effective, how to determine the amount of microbes to add, and what means of delivery of these quantities should be employed.

SUMMARY OF THE INVENTION

One object of this invention is to provide a method for reducing the presence of hydrogen sulfide and methane gas within sewage collection systems.

Another object of this invention is to provide a method for reducing such gases by the introduction of select microbes into the collection system.

It is also an object of this invention to provide a method for reducing such gases which is more cost effective and controllable than previous techniques.

Therefore, a method of reducing undesirable gases in a wastewater collection piping system is provided, wherein the piping system includes an interior surface and a plurality of pumping stations for periodically moving the wastewater progressively toward a wastewater treatment facility, and wherein the wastewater includes a predominant waste material, the method comprising the introduction of select microbes into the piping system at a frequency corresponding to the pumping activity of the pumping stations, and in an amount proportional to the surface area of the interior surface of the piping system; wherein the select microbes are capable of completely consuming the predominant waste material in the wastewater; and wherein an anaerobic biomass comprising almost entirely the select microbes is formed along the interior surface of the piping system. In the foregoing method, the select microbes are preferably non-pathenogenic and may be introduced in an initially non-active state. Furthermore, the select microbes may also be capable of functioning in either an aerobic or an anaerobic manner.

In a more preferred embodiment, the level of nitrogen in the piping system is monitored, and the introduction of the select microbes is adjusted to maintain at least 0.1 mg/l of total nitrogen in the wastewater. Optionally, a predetermined quantity of ozone may be introduced into the piping system at selected locations to further reduce the presence of the undesirable gases.

DETAILED DESCRIPTION OF THE INVENTION

Figure 1:
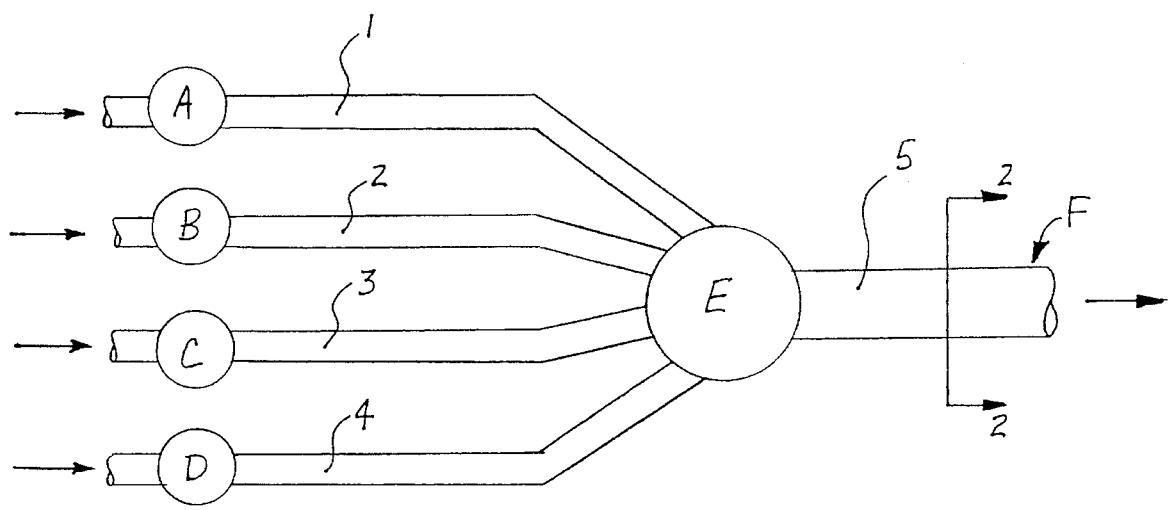
FIG. 1 is a schematic diagram depicting a portion of a typical collection piping system used to collect wastewater in sewage treatment systems.
Figure 2:
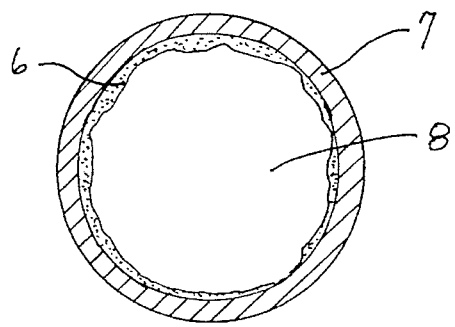
FIG. 2 is a cross-sectional view taken along Section 2—2 of FIG. 1 to illustrate the presence of the biomass adhering to the interior surfaces of the piping system.

Turning now to FIG. 1, a portion of a typical collection piping system is shown to comprise, by way of example only, four smaller conduits 1–4 which converge into a larger single conduit 5 leading toward other conduits or a treatment plant (not shown). Further details of FIG. 1 and its relationship to the present invention will be provided later herein. A cross-sectional view of the piping system is also shown in FIG. 2, taken along Section 2—2 of FIG. 1, depicting the manner in which the biofilm 6 adheres to the inside pipe surface 7. The formation of this biofilm 6 is critical to the effective treatment of the wastewater 8, and it may be referred to as an "anaerobic fixed film bioreactor". The biomass can be adjusted through competitive exclusion to affect not only the SRB's, but also actively degrade the wastewater contaminants as they flow to the treatment plant. As a result, the control of hydrogen sulfide can be accomplished while reducing the amount of organic contaminants (both dissolved and suspended solids), with the overall benefit of a reduction in the total biological oxygen demand (BOD) at the treatment plant entrance. Since each pound of BOD translates into a certain amount of sludge, which requires disposal, such reductions in BOD would reduce treatment plant operating costs. The combined effect would be to reduce the amount of hydrogen sulfide in the collection system while reducing the sludge production at the treatment plant. In current practice, the cost of sludge processing and disposal is approximately 50% of the ongoing operating cost of the treatment plant. The savings related to sludge will more than pay for the cost of administering the present invention.

In order to have the desired affect on the biomass, select microbes must be added in sufficient quantities and at strategic locations in the outermost reaches of the piping network. In order to achieve this in an economical fashion, a new understanding of the dynamics of the collection system and new technology involving microbes was required.

To illustrate, an example is taken of a small portion of a collection system, shown in FIG. 1. The portion deals only with the forced mains, because most gravity mains have good contact with air and are not strictly anaerobic. The example consists of four segments 1–4 of 6-inch diameter piping, each 1,000 feet in length, which connect into a single 12-inch diameter segment 5, also 1,000 feet in length.

TABLE 1

| | Collection System Network Analysis | | | | | | |
|---|---|---|---|---|---|---|---|
| SEGMENTS | A-E | B-E | C-E | D-E | A/D-E | E-F | TOTAL |
| PARAMETERS | | | | | | | |
| PIPE SIZE (inches) | 6 | 6 | 6 | 6 | | 12 | |
| AREA (sq. ft./ft.) | 1.5708 | 1.5708 | 1.5708 | 1.5708 | | 3.1416 | |
| VOLUME (cu. ft./ft.) | 0.19635 | 0.19635 | 0.19635 | 0.19635 | | 0.7854 | |
| LENGTH (ft.) | 1000 | 1000 | 1000 | 1000 | 4000 | 1000 | 5000 |
| Total volume (cu. ft.) | 196.35 | 196.35 | 196.35 | 196.35 | 785.4 | 785.4 | 1570.8 |
| Total volume (gal.) | 1473 | 1473 | 1473 | 1473 | 5891 | 5891 | 11781 |
| Total volume (cu. mm × $10^9$) | 5.52 | 5.52 | 5.52 | 5.52 | 22.08 | 22.08 | 44.16 |
| Total area (sq. ft.) | 1570.8 | 1570.8 | 1570.8 | 1570.8 | 6283.2 | 3141.6 | 9424.8 |
| Total area (sq. mm × $10^7$) | 1.17 | 1.17 | 1.17 | 1.17 | 4.68 | 2.35 | 7.04 |
| MCU DENSITY × $10^6$ | | | | | | | |
| MCU Surface Populat. (×$10^{13}$) | 1.17 | 1.17 | 1.17 | 1.17 | 4.70 | 2.35 | 7.04 |
| Vol. concentration/cycle (×$10^3$) 4 HOUR NO-FLOW CONCENTRATION | 2.13 | 2.13 | 2.13 | 2.13 | 8.50 | 1.06 | 9.57 |
| MCU concentration per 16 cycles (×$10^4$) 20 HOUR NO-FLOW CONCENTRATION | 3.40 | 3.40 | 3.40 | 3.40 | 13.60 | 1.70 | 15.30 |

TABLE 1-continued

| | Collection System Network Analysis | | | | | | |
|---|---|---|---|---|---|---|---|
| SEGMENTS | A-E | B-E | C-E | D-E | A/D-E | E-F | TOTAL |
| MCU concentration per 40 cycles ($\times 10^4$) | 8.50 | 8.50 | 8.50 | 8.50 | 34.00 | 4.25 | 38.25 |
| DESIGN VELOCITY 2 ft./sec. | | | | | | | |
| FLOW RATE (cu. ft./sec.) | 0.3927 | 0.3927 | 0.3927 | 0.3927 | 1.5708 | 1.5708 | 3.1416 |
| FLOW RATE (gal./min.) | 176.72 | 176.72 | 176.72 | 176.72 | 706.86 | 706.86 | 1413.72 |
| 4 HOURS FLOW VOLUME (gal. $\times 10^4$) | 4.24 | 4.24 | 4.24 | 4.24 | 16.96 | 16.96 | 33.92 |
| Total biomass per segment - 20 hours NO FLOW ($\times 10^{14}$) | 4.70 | 4.70 | 4.70 | 4.70 | 18.80 | 9.39 | 28.19 |
| Total biomass per segment - 4 hours NO FLOW ($\times 10^{14}$) | 1.88 | 1.88 | 1.88 | 1.88 | 7.51 | 3.76 | 11.27 |

Table 1, entitled "Collection System Network Analysis" is an analysis of the piping network in the example. This analysis makes some simplifying assumptions to make it easier for the reader to understand the dynamics of the system. Collection system flows vary with the nature of the homes or businesses connected to the various branches. In general, flow in the outer reaches occurs only about a total of 4 hours per day. This 4-hour total is spread over three main periods, namely early to mid-morning, early evening and late evening. These periods correspond to the times when most people are getting ready for work, coming home and just before bedtime.

Therefore, there are periods when there is no flow in the piping and the segments are "stagnant". When stagnant periods occur, the piping behaves like a batch-type incubator. At other times it resembles a flow-through reactor. In the batch-type mode, the volume in the piping segment is fixed while the "free swimming" biomass continues to accumulate as the biomass on the piping walls reproduces. In the flow-through mode, the accumulations of free swimming biomass move down stream into the larger diameter piping.

In actual practice, the total length of small diameter piping is many times that of the larger diameter piping. The ratio of the inside piping wall area to the volume is much greater in the smaller segments 1–4 than in the larger segment 5, as evidenced by the data from Table 1. The importance is shown by comparing the total wall area of the four branches 1–4 to the total wall area of the trunk segment 5. The combined branches 1–4 are double the inside wall area of the trunk segment 5. A similar comparison of the volumes shows that the total volumes, however, are the same.

The analysis of Table 1 assumes that the inside surface area of the piping is completely filled with microbial mass. According to the teachings of Day (U.S. Pat. No. 5,413,713), this mass will reproduce itself every 20 to 60 minutes. Therefore, the concentration of free swimming microbes within the stagnant segments will increase, periodically, by an amount equal to the wall population. Now, consider that the wall surface area is populated by a mixture of microbes, all competing for space to attach themselves so that they may reproduce. Recall that anaerobes can only reproduce when attached to some surface.

Another factor in the growth of the biofilm is that the reproductive rates of the various microbes are a function of the genetic makeup of each microbe and the available supply of food. As the different microbes have different metabolic pathways, i.e. they consume and excrete different molecules, the overall population will be dictated first and foremost by the available food supply and secondarily by the reproductive rate. Since the reproductive rate is genetically controlled, under a given set of food supply conditions, symbiotic microbes with higher reproductive rates will dominate the population.

Furthermore, since it is the nature of life forms to adapt to changing conditions (commonly referred to as mutating) the overall population will be adjusting each strain's metabolic pathway towards optimization under the current conditions. In commercial biological processes, great care is taken to attain a steady state condition with pure strains of bacteria to prevent the natural mutation process from occurring and thereby changing the bio-product. Contrarily, a sewer collection system has a dynamic state that is constantly changing.

To overcome the dynamics of the biomass on the sewer collection system piping walls, the present invention utilizes the competitive exclusion principle. Table 1 represents the calculation of total wall biomass on a simple example system segment. A mean colony unit (MCU) population density of $1.0 \times 10^6$ microbes/sq. mm is used for the wall biomass calculation for convenience. Note that the cyclical buildup of free swimming microbe concentrations (Volume concentration/cycle) is larger in the smaller diameter piping ($2.13 \times 10^3$ microbes/cu. mm) than in the larger piping ($1.06 \times 10^3$ microbes/cu. mm). This is due to the greater ratio of inside wall surface area to volume in the smaller segments. The example assumes a 30-minute average reproductive cycle to represent all populations. If one assumes that the typical "batch" or no-flow period is 4 hours, then the total microbe population in the smaller pipe segments reaches $7.51 \times 10^{14}$ microbes. This population exists in a total volume of 5,891 gallons. When this amount moves downstream during a pump period, it then resides in the next segment. As Table 1 indicates, the total number of microbes in the downstream segment will suddenly double. When the flow stops in this condition, as is often the case, there is a sudden surge in microbe population density. Since the water with the microbes is the same water that the microbes have been feeding on upstream, the tendency for competitive exclusion in the downstream segments is towards the more efficient microbes.

This tendency carries over to the wall biomass resulting in a shift in the dominant microbe species. In many cases, especially where sulfur is in large supply in the water either from normal contaminants or naturally occurring in the drinking water, the SRB's will become dominant. Since one of the products of SRB metabolism is hydrogen sulfide, the amount of hydrogen sulfide in the water will therefore increase. If the segment remains stagnant for any significant period of time, the SRB's will continue to increase until the available food supply begins to decline. At that point, some of the SRB's will cease to function and enter a "spore" state. These spore-state microbes will resume their metabolic processes when the flow starts moving again and more nutrients become available from new additional piping segments.

The present invention utilizes select symbiotic bacteria with a high reproduction rate and minimum gas production to out-compete the SRB's and certain other bacteria. These select bacteria are normally found in sewer systems, but their numbers are commonly small and are not in the correct ratios for optimum performance. As a result, the SRB's, under normal conditions, usually out-compete these select microbes.

In order to gain and hold the advantage over the SRB's, the select microbes must be introduced in significant quantities at specific times. Ideally, these bacteria will not only competitively exclude the SRB's, but also most of the naturally occurring biomass on the piping walls. When introduced in correct proportions, these select microbes not only consume the available material in an efficient manner, but also reproduce themselves in the similar fashion as indicated in Table 1. These ever-growing populations of select bacteria will consume the available material and reinforce each other as the flow moves through the collection system.

The advantage to treatment in the piping over conventional plant treatment is that the free swimming microbes consume the available food material without reproducing. Therefore, there is a reduction in contamination without the substantial increase in microbial mass which always accompanies aerobic treatment within the treatment plant. Furthermore, many of the select microbes available for use with the present invention are "facultative", which allows them to switch to aerobic metabolism at the treatment plant, further improving treatment plant performance.

In normal commercial operations, microbes are sold as concentrates with microbe colonies in concentrations ranging from $10^7$ to $10^8$ to the cubic millimeter. At these concentrations, a large volume of microbe solution is needed for even modest wastewater flow volumes, and the number of gallons per day per site would be prohibitively expensive. However, new technology has evolved where microbes are suspended in spore state and concentrated or compressed to $10^{14}$ microbes/cu. mm and higher. Therefore, new concentrations 10,000 to 1,000,000 times more concentrated than before can be produced. What once took a tanker truck can now be reduced to a quart container, volumetrically, or less.

Consequently, dosing concentrations where a single cubic millimeter can contain more microbes than entire segments of piping with long stagnant periods can now be applied to control the biomass within the piping in an affordable manner. For example, a dosing station can have a five-liter bag and a battery-powered, microprocessor-controlled pump which adds a small, predetermined amount of concentrate according to a specific dosing schedule coinciding with the forced main pumping operation. The amount of concentrate and concentration of microbes added are determined by first calculating the actual wall surface area within the given piping segment, e.g. A–E or C–E. The types of microbes used and their ratio within the dosing mixture will be a function of the nature of the waste water being added to the collection system in the area of the segment. Ideally the microbe mixture will support complete consumption of the available food supply. For example, the dosing mixture used for an area with a commercial brewery discharging to the collection system will be different from that used in an ordinary residential area. The dosing mixture used in restaurant areas will be geared for significant oil and grease loads, and dosing mixtures in the area of a bakery will be adjusted for carbohydrate reduction. Therefore, the precise microbes used and the precise ratios of such microbes in the dosing mixture may be determined through routine laboratory experimentation using representative samples of the wastewater in the collection system.

The reason for using the wall surface area as the controlling factor in the amount of concentrate added is to avoid adding too many microbes. A small excess of microbes is of no consequence, but a large excess may result in rapid consumption of the available food source and reversion to spore state. This is very possible if the available nitrogen supply is depleted. The select facultative microbes in the anaerobic state rely upon nitrogen for their metabolic processes. The SRB's, on the other hand, do not. Therefore, if the available nitrogen supply is depleted, the select facultative microbes will cease functioning before the food supply is depleted, and the SRB's will return.

The addition of the concentrate must continue, even after the SRB's have been virtually eliminated, to prevent the SRB's from recurring in large numbers. Once the piping wall biomass has been converted to that needed to facilitate utilization of the food source in the water, the converted biomass areas act as incubators to enhance and intensify the effect downstream and work towards elimination of the SRB's in the downstream piping. It is imperative, however, that dosing continue to prevent the re-establishment of the SRB colonies as such re-establishment will begin the cycle again, only in favor of the SRB's.

The amount of concentrate administered by each dosing station can be fine tuned by monitoring the nitrogen levels at various points downstream in the collection system. The preferred control point is to adjust the concentrate addition to where about 1.0 milligram per liter of total nitrogen or greater is present at all locations, although amounts as low as 0.1 milligram per liter may also be effective. This can only be determined by frequent testing in the early stages of practicing the invention. A secondary measure of success is the amount of dissolved hydrogen sulfide in the water stream. However, this only indicates the absence of SRB's and not whether excessive concentrate is present.

Another important aspect of the invention is that during the first one to three weeks of concentrate addition, the levels of hydrogen sulfide in solution will increase dramatically in the downstream segments. This increase is the result of the displacement of the SRB's from the walls in the downstream segments of the system. As these SRB microbes are displaced, they move into the downstream piping and accumulate. This actually acts as a competitive exclusion process as the presence of these large number of SRB's in the downstream segments actually intensifies the presence on the piping walls. Also, the larger diameter piping usually has lower flow rates and, since highly anaerobic systems have high suspended solids settling rates (and the SRB's are suspended solids) the SRB's will settle out and accumulate in the piping.

The net result is a relatively short-term increase in SRB populations and, in turn, a potentially large increase in hydrogen sulfide production. This sudden, but temporary, increase in hydrogen sulfide production has erroneously caused users to judge microbial addition as counter-productive. This is especially true in very large systems where the increase period may be substantially more than two to three weeks. After several weeks have passed, however, the constant introduction of select microbe concentrate in the upstream segments, plus the incubation effect of the wall biomass, will result in colonization of the downstream segments by the select microbes.

It is during this startup period where the use of ozone, in accordance with the disclosure of U.S. Pat. No. 5,433,854, can be important. The application of ozone to critical points in the system will prevent the release of objectionable quantities of hydrogen sulfide during the startup period. Continued use of ozone at strategic locations is important after startup to counter the occasional situation where SRB's may try to reappear for any reason. Also, as stated in the '854 patent, the presence of ozone also prevents the destruction of the lift stations and treatment plant headwords due to microbial action.

In summary, the continuous addition of the select microbe concentrate to the collection piping allows competitive exclusion to turn the entire collection system into an anaerobic treatment step prior to the treatment plant. The select microbes not only reduce the hydrogen sulfide production, but also produce a minimum amount of respiratory gases as they reduce the BOD. In many applications, the reduction in BOD may be significant enough to offset the entire cost of the erosion and odor control technologies through the resultant reduction in sludge production. An increase in treatment plant capacity may also be possible due to the reduced BOD loading and fresh microbe populations.

Until the present invention, there has not been an affordable means of minimizing the formation of hydrogen sulfide within the collection systems. Prior to the present invention, every attempt at resolving the problems associated with hydrogen sulfide production have had a negative result for every positive result. Until a complete understanding of the mechanisms involved was realized, as demonstrated herein, success could not be achieved.

The aforedescribed benefits, i.e. sludge reduction, increased plant capacity, and the like, are ancillary to the main objective which is to reduce the production of hydrogen sulfide gas and methane gas within the collection piping system to levels which would not interfere with the practice of other pre-treatment methods, such as those disclosed in the '854 patent. In other words, the techniques disclosed in prior works are not required in order to realize the substantial advantages of the present invention when practiced alone.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A method of reducing undesirable gases in a wastewater collection piping system having an interior surface, wherein said piping system includes a plurality of pumping stations for periodically moving said wastewater progressively toward a wastewater treatment facility, and wherein said wastewater includes a predominant waste material, said method comprising:

introducing select microbes into said piping system at a frequency corresponding to the pumping activity of said pumping stations, and in an amount proportional to the surface area of said interior surface of said piping system;

wherein said select microbes are capable of completely consuming said predominant waste material in said wastewater; and wherein an anaerobic biomass comprising almost entirely said select microbes is formed along said interior surface of said piping system.

2. The method of claim 1, wherein said microbes are introduced in an initially non-active state.

3. The method of claim 1, wherein said microbes are non-pathenogenic.

4. The method of claim 1, wherein said microbes are capable of functioning in either an aerobic or an anaerobic manner.

5. The method of claim 1, wherein the level of nitrogen in said piping system is monitored, and wherein said introduction of said microbes is adjusted to maintain at least one mg/l of total nitrogen in said wastewater.

6. The method of claim 1, wherein a predetermined quantity of ozone is introduced into said piping system at selected locations to further reduce the presence of said undesirable gases.

7. The method of claim 1, wherein the introduction of said select microbes is accomplished by a microprocessor-controlled pump.

* * * * *